Figure 1:
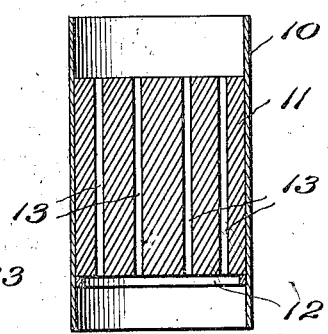

Oct. 30, 1923.

B. B. GOLDSMITH

INK CARTRIDGE

Original Filed May 21, 1919

1,472,065

INVENTOR
Byron B. Goldsmith
BY
ATTORNEY

Patented Oct. 30, 1923.

1,472,065

UNITED STATES PATENT OFFICE.

BYRON B. GOLDSMITH, OF NEW YORK, N. Y.

INK CARTRIDGE.

Application filed May 21, 1919, Serial No. 298,636. Renewed July 26, 1923.

*To all whom it may concern:*

Be it known that I, BYRON B. GOLDSMITH, a citizen of the United States, residing at New York, in the county of New York and State of New York, have invented certain new and useful Improvements in Ink Cartridges; and I do hereby declare the following to be a full, clear, and exact description of the invention, such as will enable others skilled in the art to which it appertains to make and use the same.

The present invention relates to a new and improved means for producing ink conveniently, rapidly and efficiently. Many different devices have been tried for producing ink by the simple addition of water to the ink-producing materials. These have either been contained in special receptacles, or have been in the form of tablets to be dissolved in water. Of these methods the only one which has survived is the ink tablet, as the former did not produce a suitable ink. The disadvantage of using the ink tablet is readily understood when one considers that to make ink from ink tablets it is necessary to take a measured amount of water for each tablet and place both in a suitable receptacle and agitate until there has been complete solution. In other words, it almost amounts to as much trouble in a small way as the manufacture of liquid ink does on a large scale. The consumer becomes the ink manufacturer. For this reason ink tablets are used very little. The desire to find substitutes for the liquid ink of commerce, arises from three disadvantages it has: Firstly, it is bulky and takes up much space in the factory, on the railroads, and in the dealer's stock. Secondly, it is shipped in glass and there is considerable expense in packing safely, notwithstanding which breakages cannot be avoided. Thirdly, it cannot be shipped in winter as it freezes, ruining the ink or the bottles or both. By the use of my invention it is possible for any unskilled person to produce ink of the finest quality almost instantaneously.

The basic principle of this invention resides in supplying narrow passages for the water wholly or partly lined with ink producing material, which passages are artificially constructed with such a definite relative proportion between their diameter and length that, as the water passes through them, it necessarily has time to take up the required amount of material to produce a satisfactory ink. The use of a single channel would be within this principle of construction, in which case if the channel is wide enough to have the liquid flow rapidly it would have to be long enough to allow the liquid to dissolve sufficient material, or if the channel is narrow the liquid would flow more slowly and the channel need not be so long. It is a little simpler, however, to employ a number of passages.

The actual proportions of the passages will, of course, be determined experimentally for each specific type of device placed upon the market, since these will depend (among other things) upon the nature of the ink-producing material and the character of the final ink desired.

The general principle underlying this invention is capable of being carried out in a variety of ways, some of which are set forth in certain copending applications for Letters Patent. There is claimed herein that general form or embodiment wherein the ink-producing material is itself channelled or perforated, whether such material be in a single mass or in separate constituent masses properly assembled, and whether or not the material be associated with a neutral backing for purposes of re-enforcement; also whether the re-enforcement is absorbent or non-absorbent.

Figure 7:
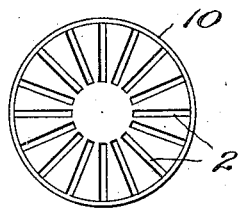
Figure 8:
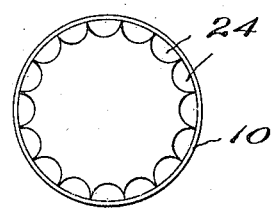
Figure 2:
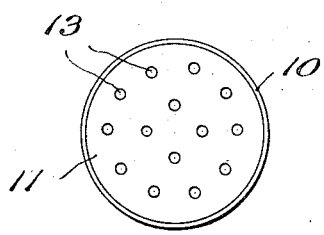
Figure 5:
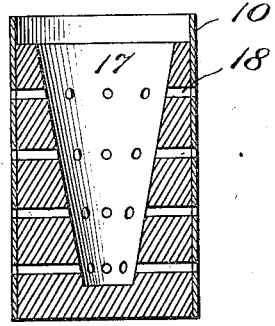
Figure 3:
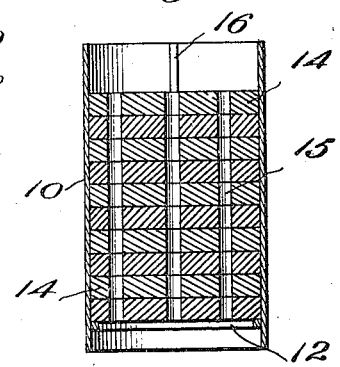
Figure 6:
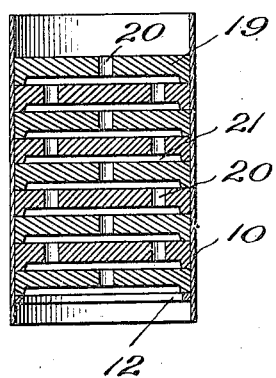
Figure 9:
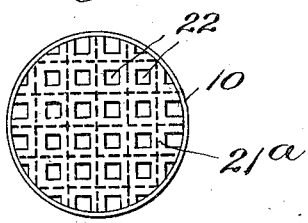
Figure 4:
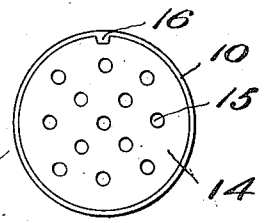
Figure 10:
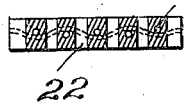

A few of many possible specific embodiments of the invention herein claimed are illustrated in the accompanying drawings wherein Figures 1 and 2 are respectively a vertical section and a plan view of one modification, Figures 3 and 4 are similar views of another modification, Figures 5 and 6 are vertical sections of two further modifications, Figures 7, 8 and 9 are plan views of three further modifications, and Figure 10 is a transverse section of one of the elements used in the form of device shown in Figure 9.

It is to be understood that the diameter and length of the channels as shown in the drawings are not supposed to be exact.

As already stated, the actual diameters and lengths of the passages will be experimentally determined for each particular type of device and character of ink.

In the form shown in Figures 1 and 2 there is an external supporting shell 10, preferably cylindrical, and made of neutral material, such as hard rubber. Within this is located a replaceable mass of ink-producing material, 11, held in place in any convenient manner, as by the ring 12. Percolating passages or channels 13 are formed extending from end to end of the body 11, and are made narrow and long enough, so that when water is passed through them at one end it will emerge at the other end in the form of an ink of the desired density and tint. This device is capable of use in various ways; as by pouring water through it into the ink receptacle or simply immersing it in water in such a manner as to cause the liquid to rise through the passages into the upper part of the device, which then serves as a dipping space for the pen.

Instead of using a single mass of ink-producing material as in Figures 1 and 2, a composite mass may be used; and the expression "body of ink producing material," in my claims is intended to cover an integral mass or a composite mass. One form illustrative of this modification is shown in Figures 3 and 4, which also shows the use of a less number of passages. Here a number of flat discs 14 are used, supported on the ring 12 and on one another. These are perforated as shown at 15, and the complete passages are formed by these perforations which are made to register. In order to assist in accurately aligning the perforations, a rib 16 inside the support 10 cooperates with suitable slots in the discs, as shown in Figure 4.

In Figure 5 is shown a form in which the passages radiate sideways from the centre instead of running vertically. The central hollow 17 may be used as a dipping space for the pen.

Where perforated superposed discs are used, it is not essential that the perforations should be made to register. In Figure 6, for instance, is shown a form wherein the ink-producing discs 19 have perforations 20 located out of line with each other. These discs are flanged on their under faces, so that a thin space 21 is left between successive discs. The water will percolate through the perforations 20 and spaces 21, thus increasing the length of the passages traveled through. This device, like that shown in Figure 1 may be used either by pouring water through it or by immersion, causing water to rise through the perforations.

The discs employed as in Figures 3 or 6, or in any appropriate manner, may be made in various ways. In Figures 9 and 10, for instance, these discs are made of an open fabric or mesh 21ª of any kind, impregnated with or covered by the ink-producing material, this partly filling up the original openings in the fabric and leaving passages 22.

In Figures 7 and 8 are shown forms of the ink making body in which the passages are formed by grooving the same longitudinally, either to produce deep radial slots 23 (Figure 7) or shallower channels 24 (Figure 8). In these cases the percolating passages are exteriorly closed by an outer shell, which is preferably the casing 10. The type of device shown in Figures 7 and 8 may be embodied either in a single integral body as in Figure 1, or in discs intended to be superposed as in Figures 3 and 6.

The structural constitution of the perforated body or bodies used in each modification (other than Figures 9 and 10) has not been illustrated. This is partly to avoid multiplication of drawings and partly to illustrate these modifications generally; it being the intention that they shall represent any body (whether of neutral material having lined passages or wholly of ink-producing material) wherein passages are provided whose walls carry ink-producing material ready to be dissolved when water is introduced.

It is further to be understood that the various forms of cartridge are capable of use in many different ways. For instance, they may be made very cheaply, with a thin lining of ink-producing material in the passages, when they might be thrown away after being used once or twice. Or again, the water may be supplied more or less rapidly according as the passages are narrower or wider; or it may be made to pass through the passages more than once.

The above description will make it clear that the invention may be embodied in a great variety of modifications, and the same is not limited to the details herein shown and described.

What is claimed is—

1. An ink cartridge comprising a body of suitable material provided with one or more passages having ink-producing material on their inner walls, said passages having definite predetermined size and proportions.

2. In an ink cartridge, a base of neutral material provided with one or more passages of definite predetermined size and proportions, said passages having ink-producing material upon their walls.

3. An ink cartridge comprising an external supporting shell and a body of suitable material carried thereby provided with one or more passages of definite predetermined size and proportions, said passages having ink-producing material upon their inner walls.

4. Means of the general character set forth in claim 1 hereof wherein the cartridge body is built up of successive perforated discs.

5. Means of the general character set forth in claim 1 hereof wherein the cartridge body is built up of successive perforated discs each composed of a neutral perforated base carrying the soluble ink-producing material.

6. An ink cartridge comprising an external supporting shell having an aligning rib, and a succession of perforated ink-producing discs fitting said shell and each having a depression fitting over said rib.

7. As a means for producing liquid ink, a network of neutral material having openings of predetermined definite size and proportions and coated with ink-producing material.

8. An ink cartridge having passages for the free flow of liquid, the walls of which contain ink-producing material.

9. An ink cartridge consisting of channeled ink-producing material for the passage of liquid.

10. An ink cartridge having an inlet and an outlet opening communicating with each other by means of passages, and ink-producing material in said passages.

In testimony whereof, I affix my signature.

BYRON B. GOLDSMITH.